United States Patent
Giorgis et al.

(10) Patent No.: US 7,768,742 B2
(45) Date of Patent: Aug. 3, 2010

(54) METHOD AND APPARATUS FOR PROVIDING A TRUNCATED PROFILE PROBE FOR PERPENDICULAR RECORDING

(75) Inventors: Binyam A. Giorgis, San Jose, CA (US); Hugo A. E. Santini, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 267 days.

(21) Appl. No.: 10/430,949

(22) Filed: May 7, 2003

(65) Prior Publication Data
US 2004/0223258 A1 Nov. 11, 2004

(51) Int. Cl.
*G11B 5/187* (2006.01)
*G11B 5/31* (2006.01)

(52) U.S. Cl. .............................. 360/125.13; 360/125.09

(58) Field of Classification Search ................ 360/317, 360/122, 125, 126, 125.03–125.15
See application file for complete search history.

(56) References Cited

U.S. PATENT DOCUMENTS

| | | | |
|---|---|---|---|
| 5,805,391 A | 9/1998 | Chang et al. | |
| 5,850,326 A | 12/1998 | Takano et al. | |
| 5,896,249 A | 4/1999 | Fontana, Jr. et al. | |
| 5,991,126 A | 11/1999 | Hayashi et al. | |
| 6,029,339 A | 2/2000 | Chang et al. | |
| 6,282,068 B1 | 8/2001 | Pinarbasi | |
| 6,697,221 B2 * | 2/2004 | Sato et al. | 360/126 |
| 6,728,064 B2 * | 4/2004 | Sato et al. | 360/126 |
| 2002/0028355 A1 | 3/2002 | Nakamura et al. | |
| 2003/0137779 A1 * | 7/2003 | Santini et al. | 360/317 |
| 2004/0196589 A1 * | 10/2004 | Lille | 360/125 |

OTHER PUBLICATIONS

Pool, "Exploring Frontier Materials," Your Window on IBM Innovation, Think Research, http://domino.research.ibm.com/comm/wwwr_thinkresearch.nsf/pages/frontier399.html, date Dec. 13, 2002.

Thompson et al., "The Future of Magnetic Data Storage Technology," IBM J. Res. Develop., vol. 44, No. 3, May 2000.

IBM's New Magnetic Hard-Disk-Drive Media Delays Superparamagnetics Effects, IBM Research News, http://www.research.ibm.com/resources/news/20010518_whitepaper.shtml, date Dec. 9, 2002.

(Continued)

Primary Examiner—William J Klimowicz
(74) Attorney, Agent, or Firm—Merchant & Gould

(57) ABSTRACT

The present invention is a truncated probe for a perpendicular recording write head. The truncated probe is formed in a resist using a pullback process. In the pullback process, a trench is formed in the resist. The resist is then heated to a required temperature for a predetermined duration of time. By controlling the temperature and time, the amount of pullback of the resist is controlled to form a specified angle for the truncated probe. Further, the present invention increases the efficiency of the write head by reducing the distance between the air-bearing surface (ABS) and a magnetic back gap of the perpendicular recording write head yokes. This reduction reduces the length of the write head and permits a faster rise time of a recorded signal.

5 Claims, 9 Drawing Sheets

OTHER PUBLICATIONS

Chen et al., "Inductiv4 Write heads for Greater Than 60 Gb/in2 Demonstration," IEEE Transactions on Magnetics, vol. 37, No. 4, Jul. 2001.

Khizroev et al., "Considerations in the Design of Probe Heads for 100 Gbit/in2 Recording Density," IEEE Transactions on Magnetics, vol. 33, No. 5, Sep. 1997.

Ito et al, "Current Progress of Single-Pole-Type GMR Heads for Perpendicular," IEEE Transactions on Magnetics, vol. 38, No. 1, Jan. 2002.

Jiang et al., "Submicronwidth Multitrack Single Pole Head for Ultra High Density Perpendicular Magnetic Recording," IEEE Transactions on Magnetics, vol. 32, No. 5, Sep. 1996.

Batra et al., "A Perpendicular Write Head Design for High-Density Recording," IEEE Transactions on Magnetics, vol. 38, No. 1, Jan. 2002.

Ertekin et al, "Avoiding the Superparamagnetic Limit with Perpendicular Recording for 500 Gb/in2 Applications," MSE 225: Thin Films, Case Study 2: 500 Gbit/iin2 HDD, Mar. 1, 2002.

Muraoka et al., "High-Density Recording Characteristics of Perpendicular magnetic Recording with Sliding-Contact Hard Disk System," Electronics and Communications in Japan, Part 2, vol. 76, No. 4, 1993.

"Perpendicular Recording," IBM Almaden Research Center, http://www.almaden.ibm.com/storagetech/recording_head/pr/index.shtml, date Dec. 9, 2002.

\* cited by examiner

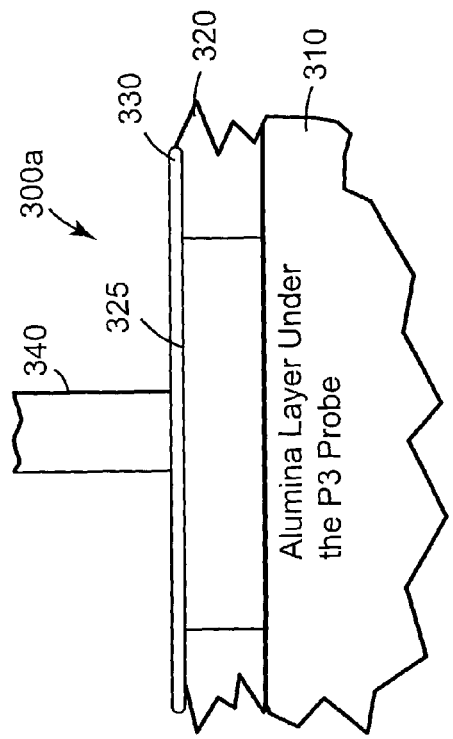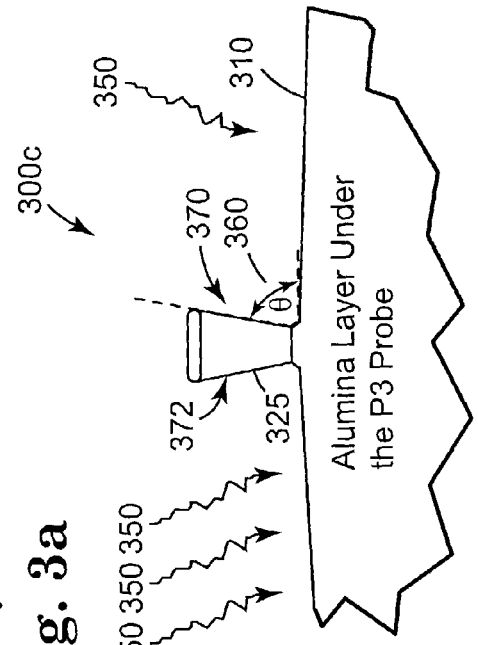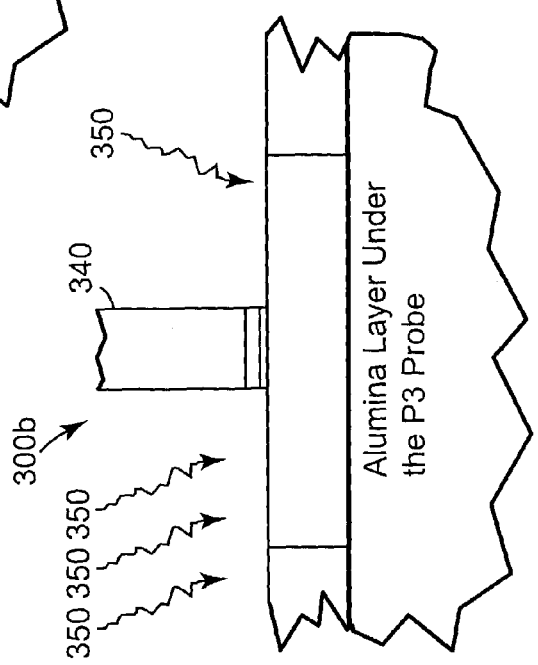
Fig. 3a
Fig. 3b
Fig. 3c

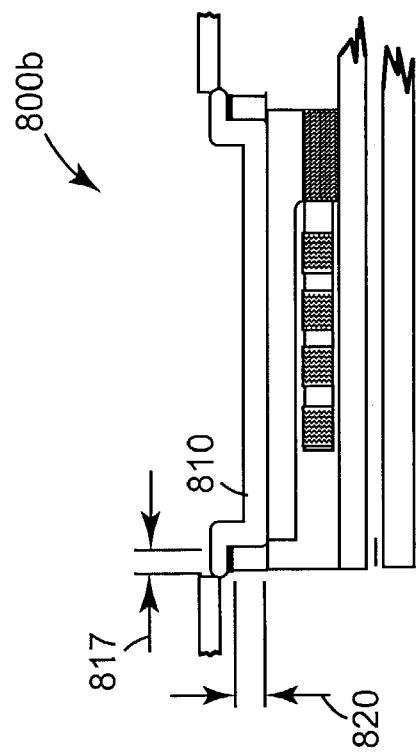
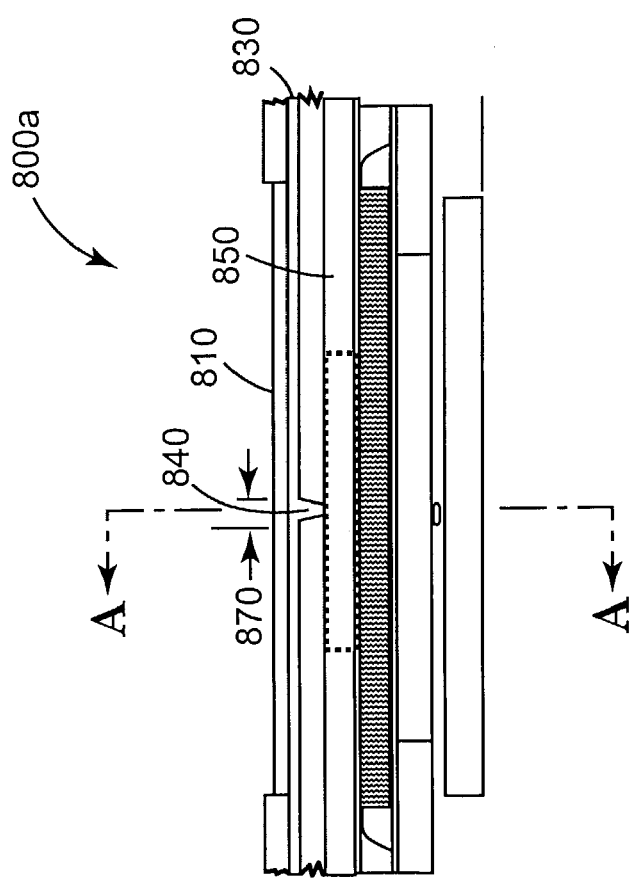
Fig. 8b
Fig. 8a

METHOD AND APPARATUS FOR PROVIDING A TRUNCATED PROFILE PROBE FOR PERPENDICULAR RECORDING

BACKGROUND OF THE INVENTION

1. Field of the Invention

This invention relates in general to perpendicular recording, and more particularly to a method and apparatus for providing a truncated write head probe for perpendicular recording using a pullback of a resist.

2. Description of Related Art

Fixed magnetic storage systems are now commonplace as a main non-volatile storage in modem personal computers, workstations, and portable computers. Storage systems are now capable of storing gigabyte quantities of digital data, even when implemented in portable computers.

Many important advances have been made that provide higher data density and thus increased storage capacities for storage systems. These advances include faster access speeds and faster access times resulting in a greater bandwidth of data communicated to and from the storage systems. Advances have also been made by greatly reducing the size and weight of the storage systems, resulting in the availability of ultra-light portable computers having state-of-the art capabilities and performance.

A disk drive is one example of a storage system. Disk drive magnetic recording densities have increased tremendously in the past few years - faster than any other means of information storage. Thus far, all production disk drives have used longitudinal recording medium. In longitudinal recording, a disk drive's recording head senses the magnetic transitions in the magnetic media that coats the disk as the head flies over the rapidly rotating disk. The amplitude of this signal is proportional to the media's magnetic thickness; a product of the media's remanent magnetic moment density ("Mr") and its physical thickness ("t"). As data densities increase, the media's magnetic thickness (known technically as Mrt) must be decreased proportionately so the closely packed transitions will be sharp enough to be read clearly. For conventional media, this means a decrease in the physical thickness of the media.

The success of longitudinal magnetic recording is rapidly approaching its limit. The point at which a magnetic domain transitions (i.e., the magnetic poles in a magnetic material change orientation or flip) under thermal fluctuations (superparamagnetic limit) will ultimately be the limit to scaling down any magnetic domain. The superparamagnetic effect originates from the shrinking volume of magnetic grains that compose the hard-disk media, in which data bits are stored as alternating magnetic orientations. Designers have shrunk the media's grain diameters and decreased the thickness of the media to increase data-storage densities while maintaining acceptable performance. However, the resulting smaller grain volume makes the magnetic grain increasingly susceptible to thermal fluctuations, which decreases the signal sensed by the drive's read/write head. If the signal reduction is great enough, data could be lost in time due to this superparamagnetic effect.

Hence, it has been long known that longitudinal recording is not the ideal recording method for maximizing magnetic areal densities. It has been predicted, and it is widely accepted, that the practical limit of longitudinal recording will be around 80-200 GB/in$^2$.

One obvious solution is to change the number of grains per bit in a magnetic material (bit cell) to extend the superparamagnetic limit. However, present manufacturing of longitudinal recording media is directed towards producing a thinner media in order to achieve better linear resolution as discussed above.

An alternative to longitudinal recording is perpendicular recording in which the medium is magnetized perpendicular to the surface of the disk. In a perpendicular recording medium, the volume per magnetic grain can be larger than in a longitudinal recording medium. However, when perpendicular recording is used with a longitudinal recording medium, as the medium's magnetic thickness (Mrt) and corresponding thickness of the magnetic write head pole tips are reduced, the write sensitivity decreases.

One known solution to avoid such an event is to introduce a soft magnetic layer under a thicker perpendicular recording medium; the soft magnetic under layer (SUL) having a high saturation magnetization (Ms) and high coercive field (He). Moreover, the perpendicular medium provides better thermal stability and a larger bit cell by permitting a thicker recording layer. Accordingly, the soft magnetic under layer introduced to the medium allows perpendicular recording to provide very high recording densities. However, in order to realize the very high recording densities, a width of a write head probe, which is limited by the pole thickness, must be reduced. In addition, a write head must provide a pole flux density near a saturation flux density of the write head material to generate a flux density greater than the residual flux density of the magnetic material.

It can also be seen that there is a need for a magnetic write head having a writing probe with a narrower profile to achieve a very high recording density at very high data rates.

It can be seen that there is a need for a magnetic write head to have a pole flux density near a saturation flux density of the magnetic write head material.

SUMMARY OF THE INVENTION

To overcome the limitations in the prior art described above, and to overcome other limitations that will become apparent upon reading and understanding the present specification, the present invention discloses a method and apparatus for forming a truncated write head probe for perpendicular recording using a pullback of a resist.

The present invention solves the above-described problems by providing a truncated probe for a perpendicular recording write head. The truncated probe is formed in a resist using a pullback process. In the pullback process, a trench is formed in the resist. The resist is then heated to a required temperature for a predetermined duration of time. By controlling the temperature and time, the amount of pullback of the resist is controlled to form a specified angle for the truncated probe.

Also, the present invention increases the efficiency of the write head by reducing the distance between the air-bearing surface (ABS) and a magnetic back gap of the perpendicular recording write head yokes. This reduction reduces the length of the write head and permits a faster rise time of a recorded signal.

A method of forming a perpendicular recording truncated write head probe in accordance with the principles of the present invention includes forming a trench in a resist, the trench having a first and second sidewall, heating the resist at a temperature for a predetermined amount of time for forming a predetermined slope in the first and second sidewalls of the trench, and forming a probe by depositing a magnetic material in the trench.

In another embodiment of the present invention, a method of increasing efficiency of a perpendicular recording write head is provided. The method includes forming a coil layer proximate to an air-bearing surface, wherein the coil produces a magnetic flux, forming a pole layer on the coil layer, the pole layer being recessed from an air-bearing surface at a predetermined distance, and forming a truncated probe on the pole layer, a length of the truncated probe being substantially equal to the predetermined distance the pole layer is recessed from the air-bearing surface, wherein establishing the coil layer proximate to the air-bearing surface provides an increase in flux density at a tip of the truncated probe.

In another embodiment of the present invention, a perpendicular recording write head is provided. The perpendicular recording write head includes a coil layer for producing a magnetic flux, the coil layer being located proximate to an air-bearing surface, a pole layer recessed a predetermined distance from an air-bearing surface, the pole layer being formed on the coil layer for transferring the magnetic flux, and a truncated probe having a length substantially equal to the predetermined distance the pole layer is recessed from the air-bearing surface, the truncated probe being formed on the pole layer for recording data on a magnetic recording medium, wherein the location of the coil layer provides an increased flux density at a tip of the truncated probe to increase a recording density.

In another embodiment of the present invention, a system for increasing efficiency of a perpendicular recording head is provided. The system includes a magnetic recording medium for storing data, a write head for recording the data on the magnetic recording medium and an actuator for positioning the write head over the magnetic recording medium, wherein the write head further includes a coil layer for producing a magnetic flux, the coil layer being located proximate to an air-bearing surface, a pole layer recessed a predetermined distance from an air-bearing surface, the pole layer being formed on the coil layer for transferring the magnetic flux and a truncated probe having a length substantially equal to the predetermined distance the pole layer is recessed from the air-bearing surface, the truncated probe being formed on the pole layer for recording data on a magnetic recording medium, wherein the location of the coil layer provides an increased flux density at a tip of the truncated probe to increase a recording density.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 3a-c illustrate a formation of a perpendicular recording head probe by a milling process;

FIGS. 8a and 8b illustrate the formation of the perpendicular recording probe according to the present invention.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention is a truncated probe for a perpendicular recording write head. The truncated probe is formed in a resist using a pullback process. In the pullback process, a trench is formed in the resist. The resist is then heated to a required temperature for a predetermined duration of time. By controlling the temperature and time, the amount of pullback of the resist is controlled to form a specified angle for the truncated probe.

Also, the present invention increases the efficiency of the write head by reducing the distance between the air-bearing surface (ABS) and a magnetic back gap of the perpendicular recording write head yokes. This reduction in distance reduces the length of the write head and permits a faster rise time of a recorded signal as compared to a conventional non-truncated head.

Figure 1:
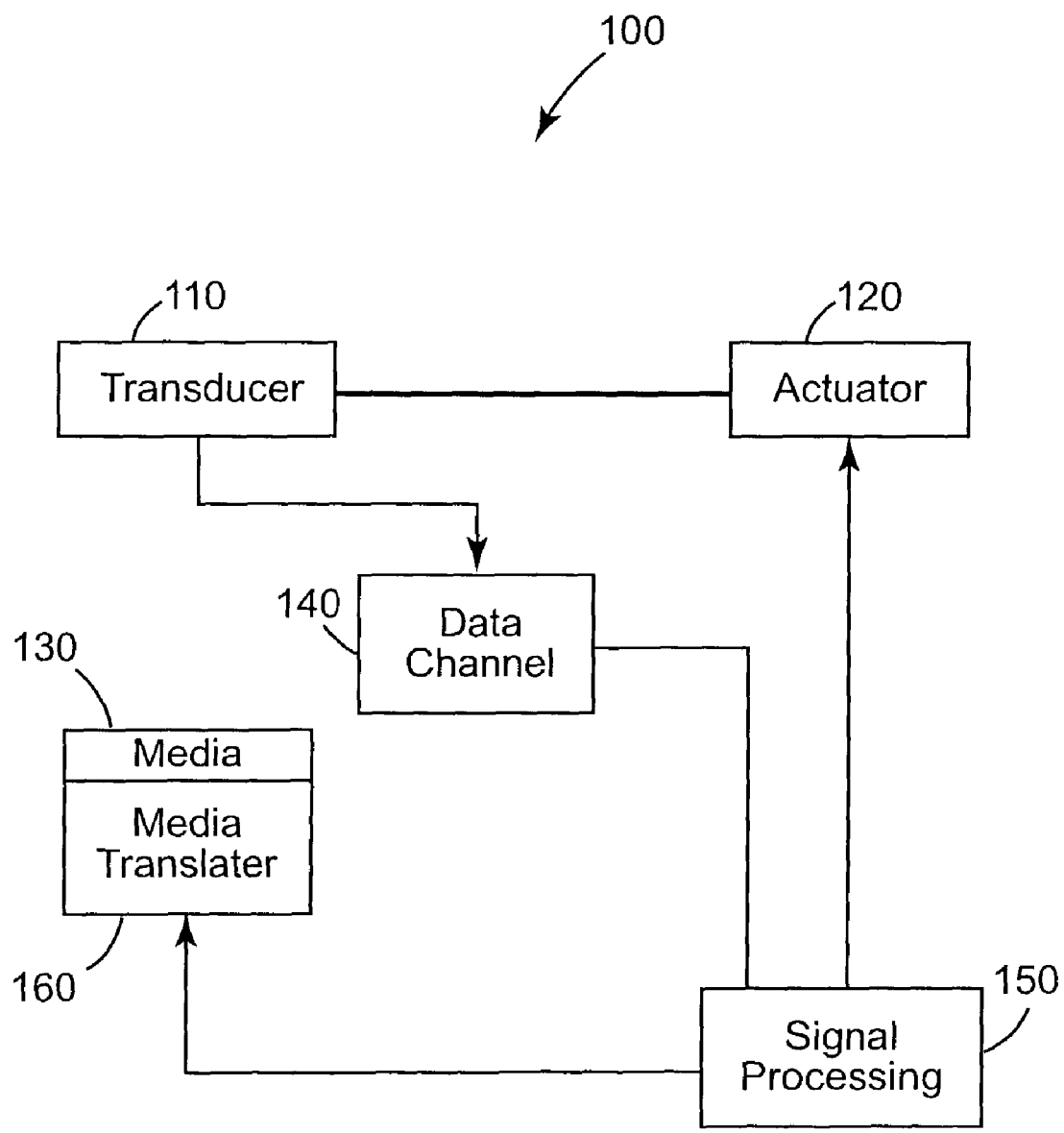
FIG. 1 illustrates a storage system.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
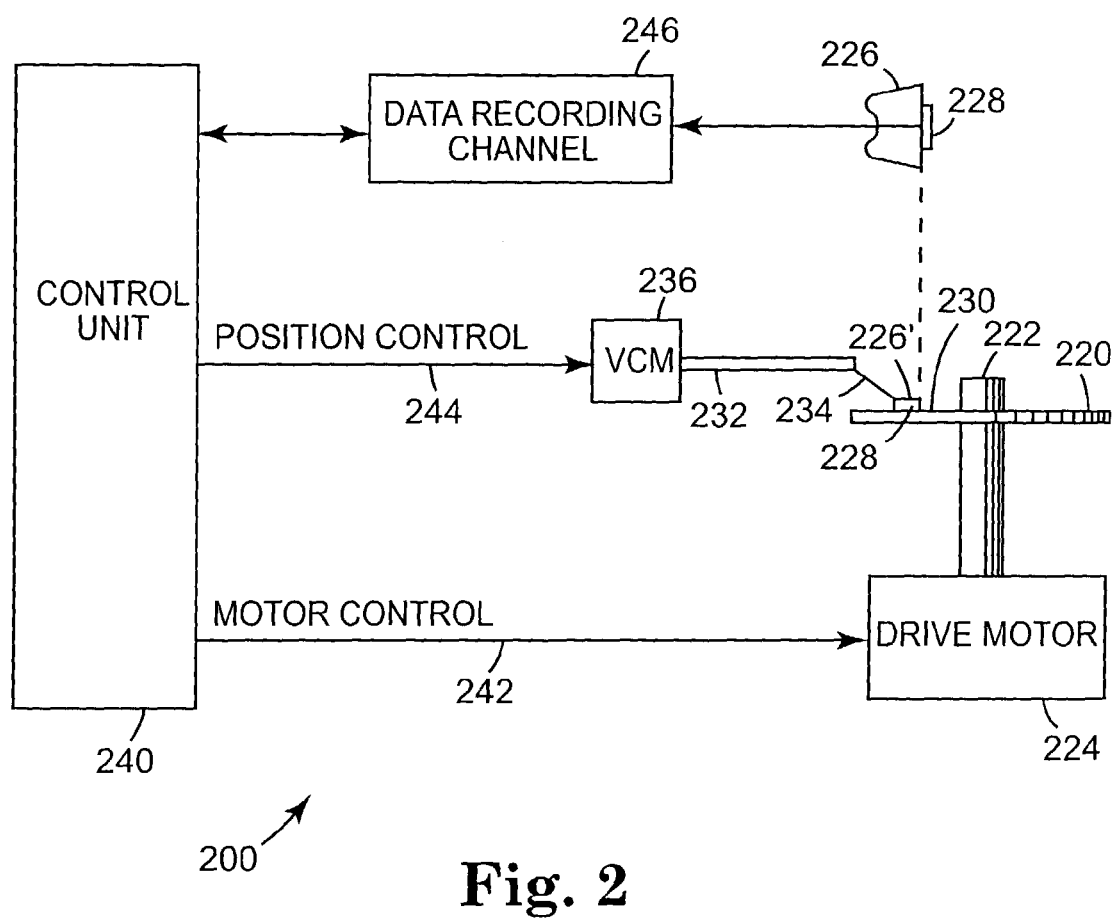
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228, wherein the heads 228 incorporate a sensor of the present invention. As the disk(s) 220 rotate, slider 226 is moved radially in and out over disk surface 230 so that the heads 228 may access different portions of the disk 220 wherein desired data is recorded. Each slider 226 is attached to an actuator arm 232 by means of a suspension 234. The suspension 234 provides a slight spring force, which biases the slider 226 against the disk surface 230. Each actuator arm 232 is attached to an actuator 236. The actuator 236 may be, for example, a voice coil motor (VCM). The actuator 236 is controlled by position control signals 244 supplied by a control unit 240.

During operation of the disk drive 200, the rotation of the disk 220 generates an air bearing between the slider 226 and the disk surface 230, which exerts an upward force or lift on the slider 226. The surface of the slider 226, which includes the heads 228 and faces the surface of disk 220 is referred to as an air-bearing surface (ABS). The air bearing thus counterbalances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as drive motor control signals 242 and head position control signals 244. The position control signals 244 provide the desired current profiles to optimally move and position the slider 226 to the desired data track on the disk 220. Read and write signals are communicated to and from the read/write heads 228 through a recording channel 246.

The above description of a typical magnetic disk drive storage system 200 is for representation purposes only. It should be apparent that disk storage systems may contain a large number of disks and actuators, and that each actuator may support a number of sliders. Many other variations of the basic typical magnetic disk drive storage system 200 may be used in conjunction with the present invention while keeping within the scope and intention of the invention. However, those skilled in the art will recognized that the present invention is not meant to be limited to magnetic disk drive storage systems as illustrated in FIG. 2.

FIGS. 3a-c illustrate a formation of a perpendicular recording head probe 300a, 300b, 300c by a milling process. In FIG. 3a, the formation of the probe 300a includes forming a probe layer 325 that is partially enclosed by an insulating layer 320, such as "alumina, deposited on an underlayer 310. A hard mask 330 is then deposited on the probe layer 325 and insulating layer 320. A high-resolution resist image 340 that defines the pattern of the probe is deposited on the hard mask 330".

FIG. 3b illustrates the removal of the hard mask 330 (FIG. 3a) in areas not protected by the resist 340 of the perpendicular recording head probe 300b. A process such as reactive ion etching (RIE) 350 may be used to remove the hard mask 330 (FIG. 3a) and the high resolution imaging resist 340.

FIG. 3c illustrates forming a profile for the perpendicular recording head probe 300c by an ion milling process. In FIG. 3c, a 15-degree negative profile 360, for example, is formed (with reference to an alumina under layer 310) via slanted ion milling 350. However, the milling process 350 creates an uncertain probe width because ion milling 350 the probe sidewalls 370, 372 produces size variations across the probe material 325. More specifically, variations in the probe sidewalls 370, 372 may be due to variations in the resist mask 340 (FIG. 3b) as well as Ion milling tooling non-uniformities.

Figures 4A, 4B:
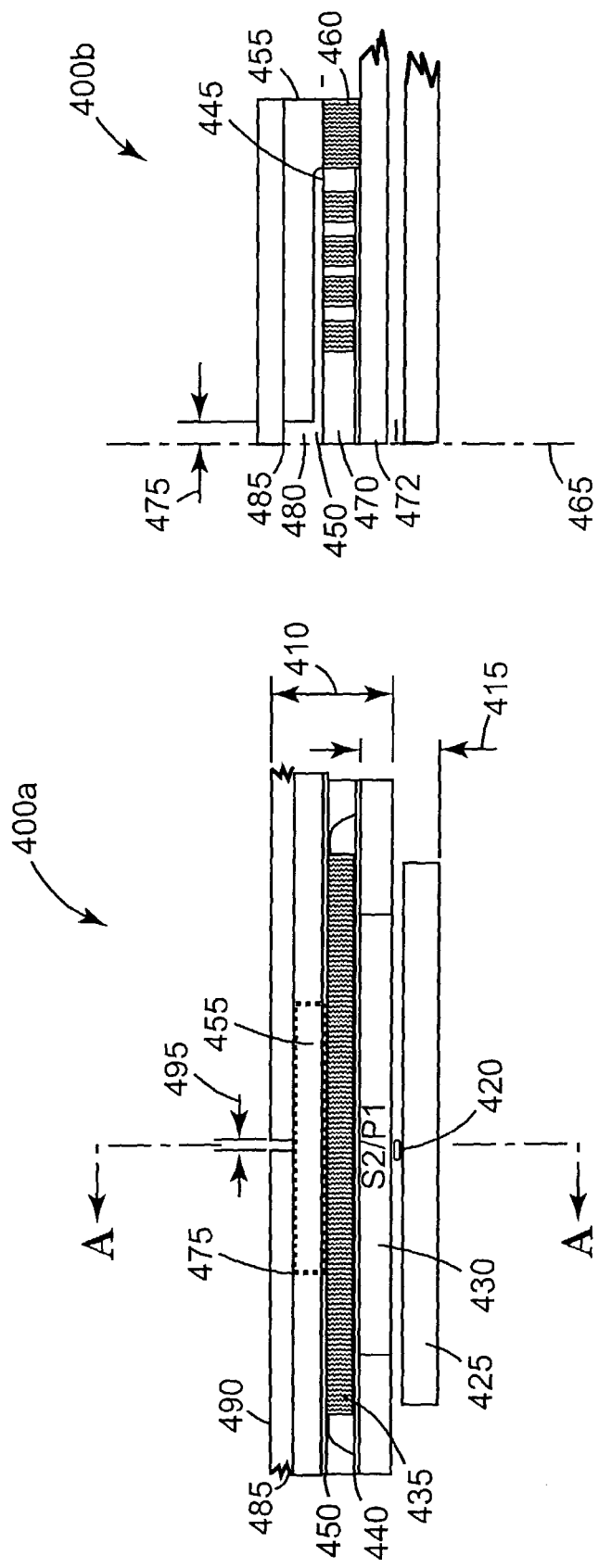
FIG. 4a is an air-bearing surface view of a perpendicular recording head structure according to the present invention.
FIG. 4b illustrates a cross-sectional view AA of the perpendicular recording head of FIG. 4a according to the present invention.

FIG. 4a is an air-bearing surface view of a perpendicular recording head structure 400a according to the present invention. The perpendicular recording head 400a includes a write head portion 410 and a read head portion 415, the read head portion employing a sensor 420. The sensor 420 is sandwiched between nonmagnetic electrically insulative read gap layers (not shown), and the read gap layers may be sandwiched between ferromagnetic first and second shield layers 425 and 430. In response to external magnetic fields, the resistance of the sensor 420 changes. A sense current $I_S$ (not shown) conducted through the sensor 420 causes these resistance changes to be manifested as potential changes. These potential changes are then processed as readback signals by processing circuitry shown in FIGS. 1 and 2.

FIG. 4b illustrates a cross-sectional view AA 400b of the perpendicular recording head of FIG. 4a according to the present invention. With reference to FIGS. 4a and 4b, the write head portion 410 of the magnetic head 400a includes a coil layer 435 sandwiched between first and second insulation layers 440 and 445 (FIG. 4b). A third insulation layer 450 may be employed for planarizing the head to eliminate ripples in the second insulation layer 445 (FIG. 4b) caused by the coil layer 435. The first 440, second 445 and third 450 insulation layers are referred to in the art as an insulation stack. The coil layer 435 and the first 440, second 445 and third 450 insulation layers are sandwiched between first pole piece (P1) 430 and second pole piece (P2) 455 layers. The first 430 and second 455 pole piece layers are magnetically coupled at a back gap 460 (FIG. 4b). The first pole piece 430 has a pole tip 472 at the ABS 465 (FIG. 4b).

In one embodiment, the second shield layer and the first pole piece layer may be a common layer 430. This type of head is known as a merged magnetic head. However, when the second shield layer and the first pole piece layer are separate layers, the head is known as a piggyback head.

In the fabrication of the perpendicular recording head 400a, 400b a first isolative material 470, such as alumina, is deposited over the coil layer 435. The first material 470 is planarized by chemical mechanical polishing (CMP). However, the invention is not limited to this process for planarization. The third insulation layer 450 may be formed on the first material 470. FIG. 4b illustrates, among other things, that the second pole piece (P2) 455 is formed on the third insulation layer 450 and creates a recessed distance referred to as a zero throat height (ZTH) 475. The zero throat height is substantially equal to the length of a probe extending from the ABS 465 to a point where the probe becomes wider by a yoke of the probe. By bringing the probe yoke closer to the ABS (i.e., a shorter ZTH 475), magnetic flux losses at a tip of the probe are decreased, creating a more efficient write head 400a, 400b.

A second material 480, such as alumina, is formed in over the second pole piece layer 455 filling in at least the area 475 between the ABS 465 and the second pole piece 455. The second material 480 is planarized by a process such as chemical mechanical polishing (CMP). However, the present invention is not limited to this planarization process. A seed layer 485, such as nickel iron (NiFe), is formed on the second material 480. However, the invention is not limited to this seed layer material. A resist 490 is then formed on the seed layer 485. A trench width 495 is formed in the resist 490 by a process, such as a photolithography process, to provide a location to deposit material for forming a perpendicular recording head probe.

Figure 5:
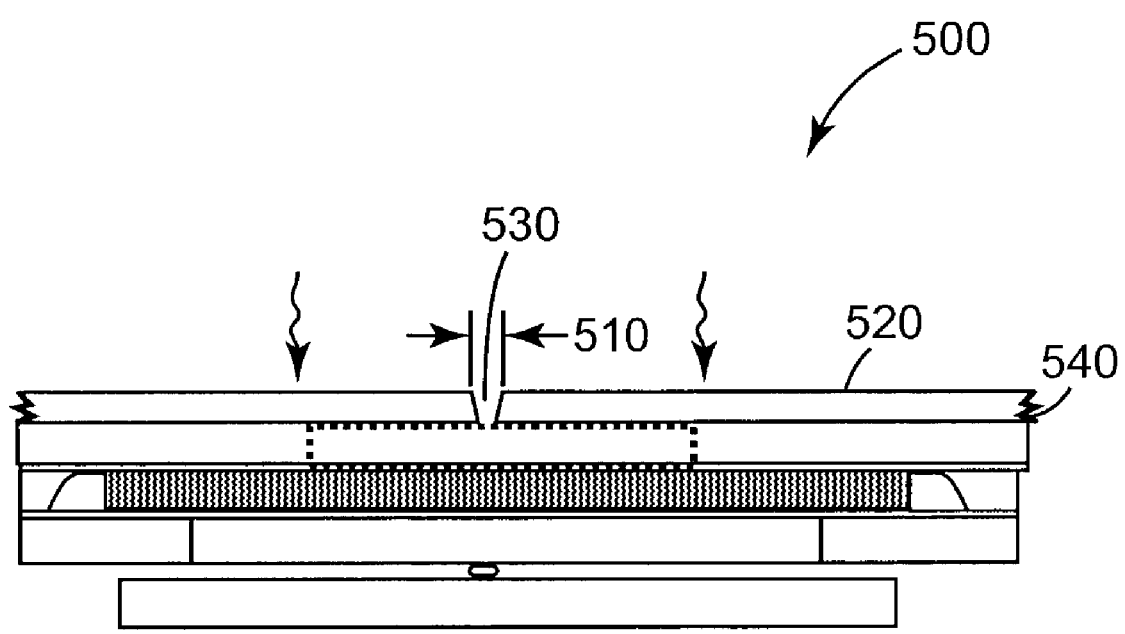
FIG. 5 illustrates the formation of a probe for a perpendicular recording head by using a damascene pullback of the resist according to the present invention.

FIG. 5 illustrates the formation of a probe for a perpendicular recording head 500 by using a damascene pullback of the resist according to the present invention. In FIG. 5, a trench width 510 is formed in a resist 520. The resist 520 is then heated to a required temperature for a predetermined duration of time. By controlling the temperature and time, the amount of pullback (angles formed by the trench walls with respect to a perpendicular of the seed layer 540) of the resist 520 is controlled to give the specified profile 530 for the perpendicular recording head probe.

Figure 6:
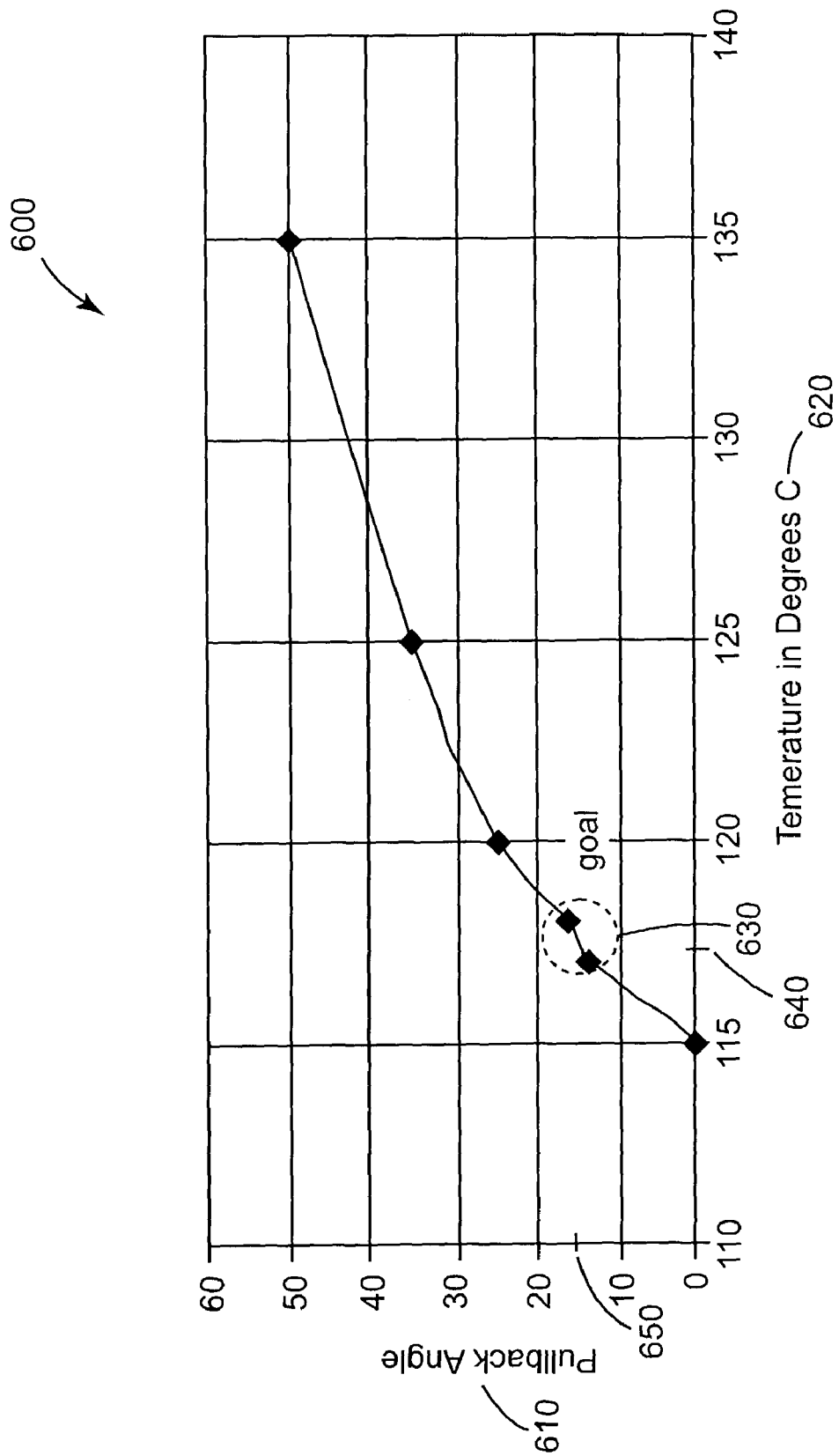
FIG. 6 is a chart illustrating different pullback angles with respect to temperature according to the present invention.

FIG. 6 is a chart 600 illustrating different pullback angles with respect to temperature according to the present invention. In FIG. 6, the chart 600 shows the different pullback angles 610 for a resist (FIG. 5, 520), such as CLARIANT™ AZ7905, baked on a hot plate for a predetermined duration at a predetermined temperature 620. For example, the CLARIANT™ AZ7905 resist may be baked for 5 minutes at a temperature of 117 degrees Celsius 640 to obtain a desired 15-degree angle 650 (i.e., the intersection 630 of the pullback angle 650 and the temperature 620). The baking process creates, but is not limited to, a trapezoidal shape for the probe as a result of the amount of sidewall tilt in the trench (FIG. 4, 495). However, the invention is not limited to this chart and different resists will require different temperatures and bake durations to obtain a desired pullback angle.

Figures 7A, 7B, 7C:
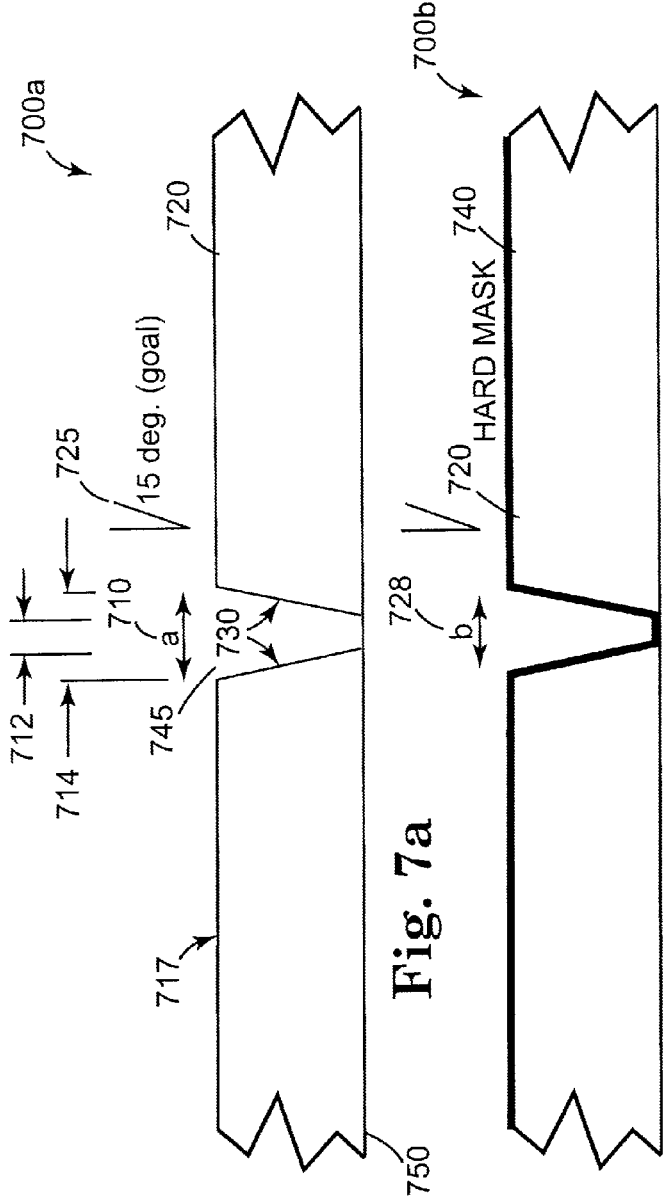
FIGS. 7a-c illustrate a dependence of a trackwidth on the pullback angle of a resist of a perpendicular recording head according to the present invention.

FIGS. 7a-c illustrate a dependence of a trackwidth on the pullback angle of a resist of a perpendicular recording head 700a-c according to the present invention. FIG. 7a shows a measurement for a required width 710 of a perpendicular recording probe formed in the resist 720. For example, a pullback of the resist 720 creates a desired angle of 15 degrees 725 in the sidewalls 730 of a trench 745 with reference to a seed layer 750.

The width 710 of the trench 745 at the surface 717 of the resist 720 will determine the write width of a track on a surface of a recording medium. The trench is formed with the width 710 of the trench 745 being wider at the surface 717, and thus the forming a perpendicular recording probe of the same.

The width 710 of the trench 745 is wider 714 at the surface 717 of the resist 720 than at the seed layer 712 to prevent a write track formed on the recording surface from being wider than the width 714. The formed probe will form a skew angle with respect to a recording surface as the perpendicular recording head moves between the inner and outer tracks of the recording medium. A trapezoidal shape of the probe will ensure that the narrower portion of the probe 712 will remain in the shadow of the wider portion 714 as the probe is skewed to the recording surface. Accordingly, the trapezoidal shape of the trench 745, and thus the formed probe, prevents the creation of a wider trackwidth as the probe is skewed with the recording surface.

FIG. 7b illustrates that a hard mask layer 740 may be formed on the resist 720 of the perpendicular recording head 700b. Accordingly, the thickness 728 of a probe is controlled by the thickness of the resist 720 (after post bake) plus the thickness of the hard mask 740, such as Tantalum Oxide (TaOx).

FIG. 7c illustrates that a seed layer 760 may be formed on the resist 720 for the perpendicular recording head 700c. The seed layer 760 may be formed subsequent to the removal of the hard mask 740 from a yoke region (not shown). For example, a hard mask layer 740 (FIG. 7b) of Tantalum Oxide (TaOx) and seed layer 760 of Nickel Iron (NiFe) may cover the trench 745, and the trench walls 730, by a process such as sputter deposition, to a required dimension 738. The trench 745, as discussed below, may be full film plated with a magnetic material.

According to the present invention, the amount of pullback depends on a post bake temperature as well as the time of baking a resist 720. However, the present invention is not limited to a single resist, temperature, or time duration for post baking. For example, the technique of the present invention is possible with other resists such as NOVOLAK™ resin materials having different molecular weight and solid contents. However, one of ordinary skill in the art will realize that each different resist 720 will develop a different pullback angle per temperature of post bake and duration of post bake.

FIGS. 8a and 8b illustrate the formation of the perpendicular recording probe 800a, 800b according to the present invention. FIG. 8a illustrates an ABS view of the perpendicular recording head 800a. FIG. 8b illustrates a cross-sectional view AA of FIG. 8a. With respect to FIGS. 8a and 8b, a full film plated magnetic layer 810 covers the entire surface of an underlying wafer to a thickness proportional to a final probe thickness 820. The magnetic layer 810 is then chemically mechanically polished until the tantalum oxide layer 830 is reached. The hard mask of tantalum oxide 830 maintains its thickness and permits the planarization of the top of the probe 840.

The required shape of the probe 840 is now formed as well as the final probe's thickness 870. The truncated length 817 of the probe 840 is also formed. After a chemical mechanical polishing operation, the hard mask 830 is removed. The hard mask 830 may be removed via a reactive ion etching operation leaving the probe 840 and the tapered resist 850 exposed. However, the invention is not limited to this removal process.

Figure 9B:
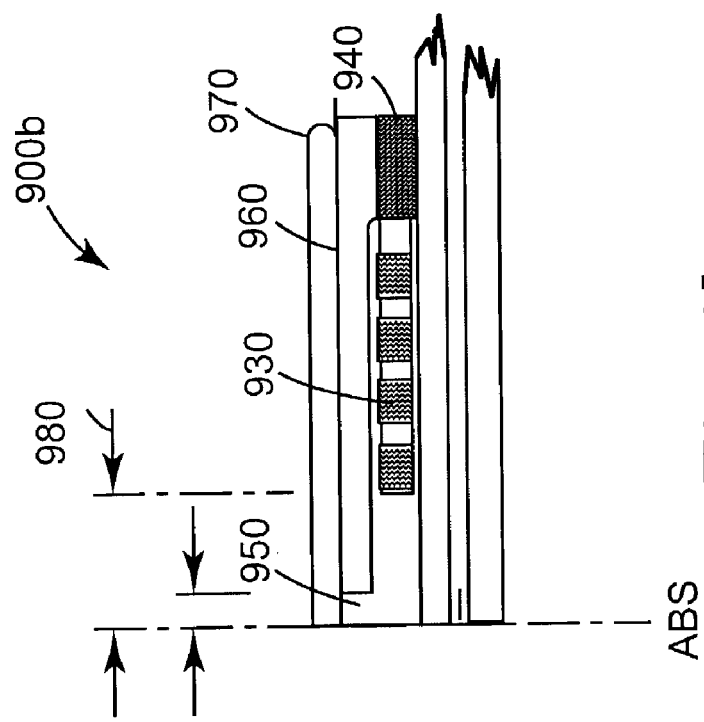
FIGS. 9a and 9b illustrate a process to remove the resist from a perpendicular recording head according to the present invention.
Figure 9A:
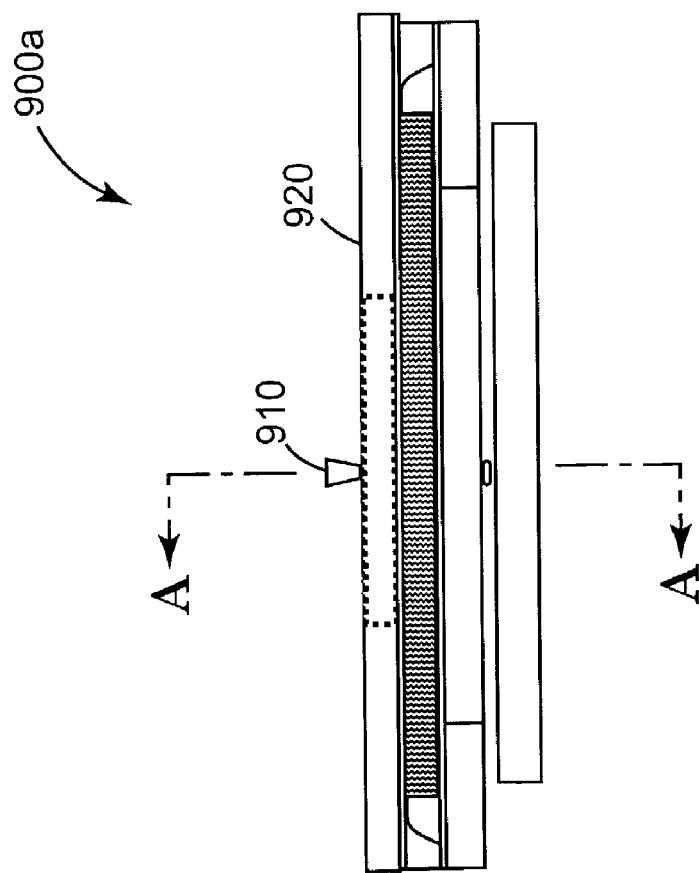

FIGS. 9a and 9b illustrates a process to remove the resist (FIG. 8, 850) from a perpendicular recording head 900a, 900b according to the present invention. FIG. 9b illustrates an ABS view of the perpendicular recording head 900a of FIG. 9a. The resist (FIG. 8, 850) may be removed by, but not limited to, an $O_2$ RIE operation leaving the probe 910 as the only structure atop the wafer 920. The perpendicular recording head 900a is then finished with a lead and stud fabrication (not shown) and an overcoat deposition (not shown). However, the present invention is not limited to this process, and the probe 910 could also be fabricated, for example, with a RIE of a hard bake layer of resist or silicon oxide ($SiO_2$).

FIG. 9b illustrates a cross-sectional view AA 900b of the perpendicular recording head of FIG. 9a according to the present invention. According to the present invention, the location of the probe 910 disposed above a P2 layer 960 allows the coil 930 to be closer to the ABS because a pole tip for the P2 layer 960 is not required. However, the invention is not limited to a P2 layer 960 without a pole tip. Accordingly, the distance between the ABS and the magnetic back gap 940 of the yoke can be reduced because the coil 930 can be moved substantially closer to the ABS.

Also, the reduction in the distance between the ABS and the magnetic back gap 940 of the perpendicular recording head 900b permits a faster rise time of recorded signals as compared to a conventional non-truncated head. This faster rise time of recorded signals occurs because a shorter recessed ZTH 950, and thus a truncated probe length, allows the coil 930 to be closer 980 to the ABS and hence reducing flux loss migrating from the coil 930 to the probe 910 through the P2 layer 960. This structure allows the flux from the coil to migrate through the P2 layer 960 into the probe yoke layer 970, and then to the probe 910 creating more magnetism (i.e., a greater flux density) and thus bringing more flux to the probe 910.

Accordingly, an efficiency of the head 900a, 900b is achieved by reducing the distance between the ABS and the magnetic back gap of the yokes 940. Hence, because of higher efficiency (the magnetic field losses being less than conventional heads), the production of write fields from a much thinner probe element 910 is possible.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A perpendicular recording write head in an intermediate stage of fabrication, comprising:
   a coil structure for producing a magnetic flux, the coil structure including an insulation stack for insulating coils, the coil structure further being located proximate to an air-bearing surface and extending toward a backgap;
   a pole, formed over the coil structure, having a first end recessed a predetermined distance from the air-bearing surface to form a recessed area between the first end and the air-bearing surface and having a second end joining the backgap, the pole extending over the coil structure between the first end and the second end for transferring the magnetic flux to the air-bearing surface;
   an isolative material formed in the recessed area between the first end of the pole and the air-bearing surface;
   a layer of heat-treated material disposed over the pole, the layer of material having a trench formed therein, the trench having a substantially trapezoidal shape with angled sides having a predetermined pullback angle for defining a trackwidth, wherein the layer of heat-treated material is a resist forming a damascene pullback trench; and
   a magnetic probe disposed in the trench of the layer of heat-treated material and forming a probetip extending to the air-bearing surface, the magnetic probe assuming the substantially trapezoidal shape of the trench, wherein opposite parallel sides of the magnetic probe have a first length and a second length, the first length being longer than the second length, wherein the second length is configured to maintain a position in a shadow of the first length as the substantially trapezoidal-shaped magnetic probe is skewed from an inner diameter to an outer diameter of a magnetic recording medium.

2. The write head of claim 1, wherein the substantially trapezoidal-shaped probe includes a first surface and a second surface, the first surface being wider than the second surface to maintain a trackwidth as the probe moves between an inner and outer track of the magnetic recording medium, wherein the second surface of the probe being proximate to the pole and the first surface of the probe being distal to the pole.

3. The write head of claim 1, wherein the probe being formed over the pole minimizes separation of the backgap and the air-bearing surface to provide greater flux density at the probetip of the substantially trapezoidal-shaped probe.

4. The write head of claim 1, wherein the substantially trapezoidal-shaped probe is configured to prevent a write track from being wider than the first length of the substantially trapezoidal-shaped probe.

5. The write head of claim 1 wherein the pullback angle of the angled sides of the trench having a substantially trapezoidal shape is selected using a predetermined baking temperature and baking time.

* * * * *